Figure 1:
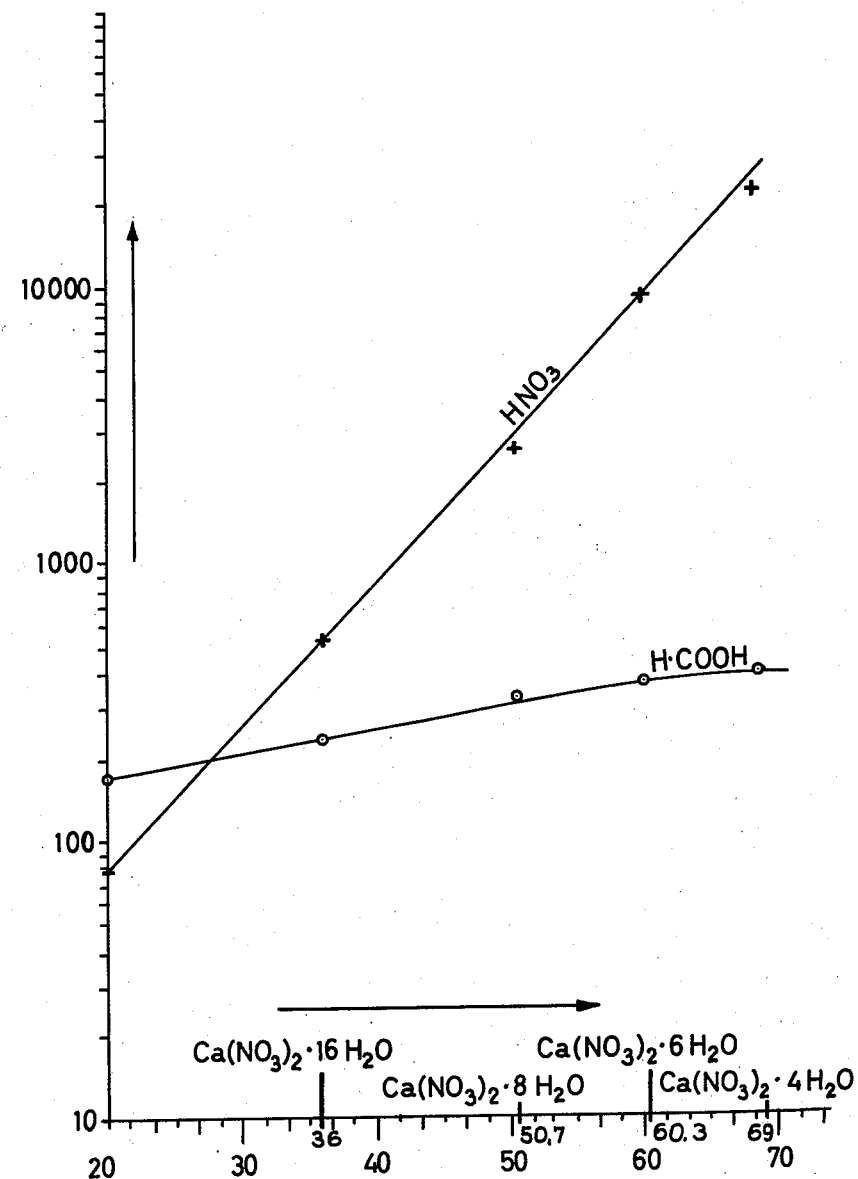

United States Patent Office 2,814,644
Patented Nov. 26, 1957

2,814,644

PROCESS FOR THE PRODUCTION OF ANHYDROUS FORMIC ACID AND NITRATES FROM ALAKLINE-EARTH METAL FORMATES

Herbert Klapproth, Oestrich im Rheingau, Germany

Application February 13, 1956, Serial No. 565,217

Claims priority, application Germany February 16, 1955

7 Claims. (Cl. 260—542)

This invention relates to a process for the production of anhydrous formic acid and nitrates from alkaline-earth metal formates.

According to the process disclosed in Swiss patent specification 162,631, calcium formate is decomposed with dilute nitric acid in the presence or absence of buffer substances such as amines or urea, and the dilute formic acid which is formed is obtained by extraction. A process for obtaining concentrated formic acid by reacting formates with nitric acid has recently been described in German patent specification 831,240. It is known to suspend calcium formate with the addition of urea as buffer substance in 3 times the amount of an approximately 70% aqueous formic acid and to decompose it while stirring and cooling at 20° C. with little more than the equivalent amount of a 98% nitric acid. The reaction mixture obtained in this case is subjected to a careful vacuum distillation at 29–30 mm. Hg, and about 90% of the formic acid liberated by the decomposition of the calcium formate is obtained as a first fraction between 31 and 35° C. as 88.5% acid free from nitric acid. During subsequent distillation, while the boiling point rises gradually to 113° C. relatively large amounts of water and some nitric acid also pass over as well as formic acid and these are used for forming a paste with a fresh batch of calcium formate. Calcium nitrate and urea remain as residue.

For the reasons stated below, it has not hitherto been possible for a concentrated reaction mixture of calcium formate and concentrated nitric acid to be worked up to produce formic acid by the extraction process:

It is known that nitric acid, particularly in relatively high concentrations, is not only a strong mineral acid but is at the same time a strong oxidising agent. When reacting calcium formate with nitric acid, therefore, it is necessary to take special precautions, such as, the addition of buffer substances, operation in highly diluted aqueous solution and use of the lowest possible temperatures. In working up of a reaction mixture to give formic acid using an extraction process, it is also necessary to take into account the fact that the solvents suitable for an extraction of formic acid also have a considerable extraction power for nitric acid. For example, diisopropyl ether has a distribution coefficient of 0.17 for formic acid and a distribution coefficient of 0.107 for nitric acid in a 15% aqueous solution. With a 20% aqueous solution, the distribution coefficient of this ether for nitric acid is 0.174 and even at this concentration this value is close to that for formic acid (0.18); with a 30% aqueous solution the distribution coefficient for nitric acid is 0.315 and considerably exceeds that for formic acid, which is 0.19. When formic acid is obtained by extraction from the reaction mixture, mineral acid salt which is simultaneously formed is also still present, and therefore the extraction of the acids from true aqueous solution still does not produce a satisfactory result.

In order to clarify the extraction conditions which actually exist, the distribution coefficients of diisopropyl ether for formic acid and nitric acid with various concentrations of calcium nitrate in the aqueous phase, using the same acid content of 2% in the aqueous solution, were determined and plotted on a graph (Fig. 1 of the accompanying drawings). The curve shows that for both acids, the distribution coefficient increases as the salt content increases, but that of nitric acid increases disproportionately more than that of formic acid. Whereas the distribution coefficient for nitric acid is still substantially half that for formic acid when the aqueous phase has a salt content of 20%, it reaches the formic acid value at 28% and is twice that for formic acid with a salt content of 36%, such as is used in the reaction mixture according to Swiss patent specification 162,631, whereas with a salt content of approximately 60%, such as corresponds to the reaction mixture of German patent specification 831,240, it reaches almost 24 times the value of the distribution coefficient found for formic acid with the same salt content.

The preferential extraction of the nitric acid favours the re-formation of calcium formate from formic acid and calcium nitrate, especially since the use of nitric acid excesses is in any case avoided during the extraction.

The distribution curves for formic acid and nitric acid show that formic acid free from nitric acid can only be extracted from the reaction mixture consisting of calcium formate and nitric acid if such an amount of water is added that the salt content in the aqueous phase is below 28% and thus the distribution coefficient for formic acid is greater than that for nitric acid. Even with a salt content of 36%, based on the water, such as exists in the reaction mixture used for the extraction according to Swiss patent specification 162,631, appreciable amounts of nitric acid, namely 2.5–3%, based on the formic acid, are extracted concurrently with aqueous formic acid (53%). It is not necessary to mention that when working under more anhydrous conditions, that is, for example, with a salt content in the reaction mixture of approximately 60%, as is the case in German patent specification 831,-240, considerable amounts of nitric acid are concurrently extracted.

In an extraction process for the production of anhydrous formic acid, however, the presence of even minute quantities of nitric acid in the extract causes decomposition of the formic acid during fractional distillation, which endangers the equipment due to momentary rises in pressure.

This reaction between formic acid and nitric acid can also be delayed, but not prevented, by adding urea, since the urea nitrate initially formed is changed by acid hydrolysis into ammonium nitrate, which reacts with anhydrous formic acid in the same way as free nitric acid.

The previously proposed processes for the extraction of formic acid, therefore, did not allow anhydrous formic acid to be obtained from the reaction mixture consisting of calcium formate and nitric acid.

According to the invention, a process for the production of anhydrous formic acid by extraction from the reaction mixture consisting of calcium formate and nitric acid has been developed, such process avoiding the difficulties arising because of the concurrent extraction of nitric acid. This result is achieved by extracting a reaction mixture containing excess calcium formate countercurrently with the solvent, if desired in the presence of urea, and supplying an amount of nitric acid which is equivalent to this excess to the extraction medium only in one of the later stages. Because of the high distribution coefficient of the extraction medium for nitric acid which has already been mentioned, the nitric acid supplied in these stages travels in the same direction as the solvent opposite to the reaction mixture containing excess calcium formate, and recreases in amount as its reacts with the calcium formate to form calcium nitrate and free formic acid. The result achieved is that the extract leaving the installation contains only a little nitric acid, and no calcium formate is lost in the dilute liquor leaving the extraction.

Figure 2:
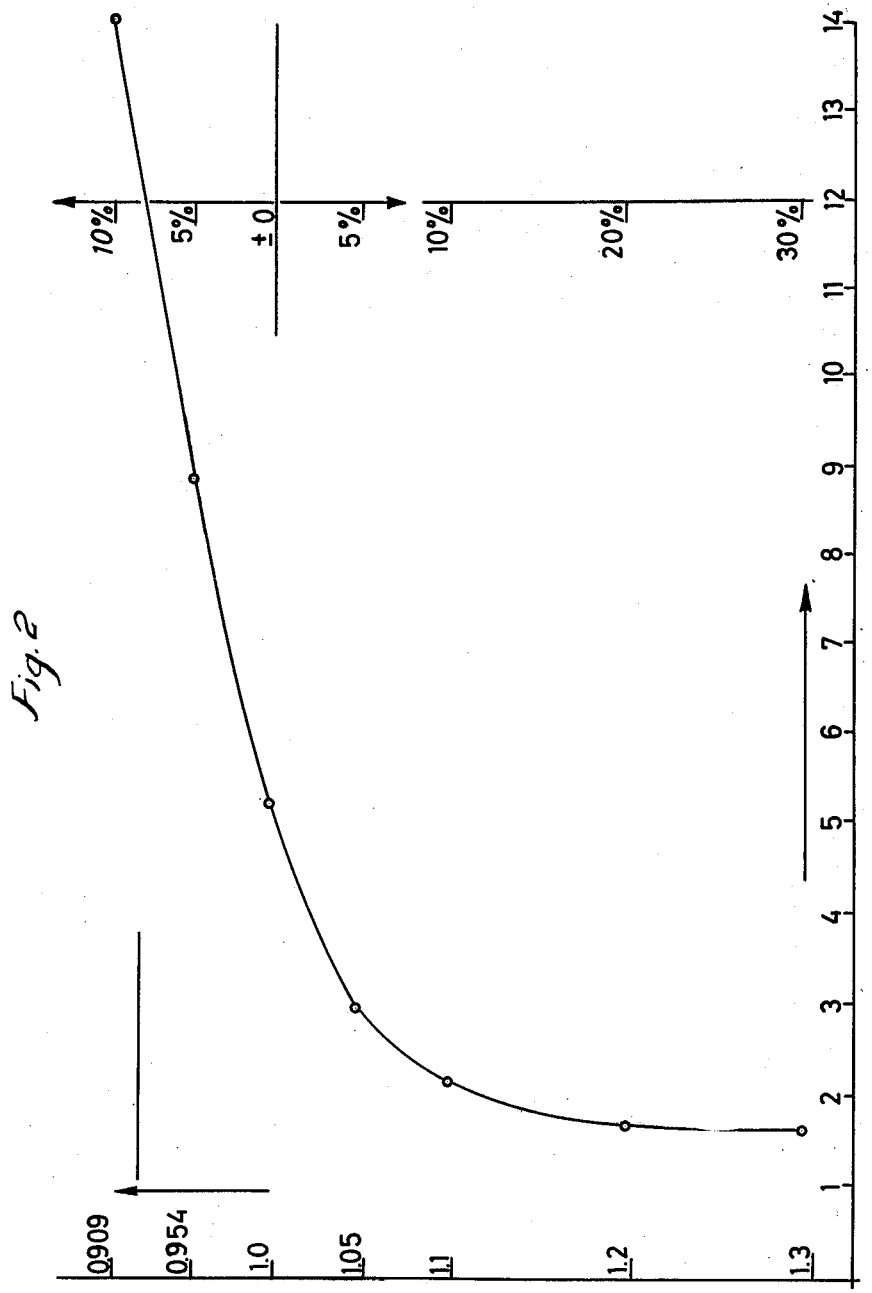

Fig. 2 is a graph illustrating the extraction ratios when this method is used. In this graph, for example assuming a reaction mixture consisting of

the content of nitric acid in the formic acid extract is plotted against the content of calcium formate in the reaction mixture. The curve shows that the nitric acid in the extract can not be completely suppressed, even by a very large excess of calcium formate in the formation mixture. The optimum excess of calcium formate which can be used corresponds in practice to the maximum amount which is soluble in the formation mixture. This means that calcium formate is only able to react in solution with the nitric acid present in the extract. Excesses which exist as sediments are without any influence. It is preferred to use calcium formate in an excess of 13–15%.

The residue of nitric acid is removed from the extract by washing the latter with a formate solution in formic acid the formic acid content of which solution is in equilibrium with the extract and fixes the nitric acid in the extract with formation of formic acid.

Accordingly the present invention provides a process for the production of anhydrous formic acid and nitrates from calcium formate and nitric acid by extracting the formic acid from the reaction mixture with a suitable solvent in the presence of urea and subsequent fractional distillation of formic acid and solvent, wherein the reaction mixture contains excess calcium formate and is extracted countercurrently with the solvent, and an amount of nitric acid which is equivalent to this excess calcium formate is added to the extraction medium in one of the last stages of the extraction, and thereafter the formic acid extract containing a small proportion of nitric acid is washed with a solution of a formate in aqueous formic acid, the formic acid content of which is in equilibrium with that of the extract, whereby the extract is made entirely free from nitric acid.

For the production of such a formate in formic acid buffer solution, it is possible to use these formates which are equally readily soluble in water and formic acid. The ready water solubility is necessary because it is only the presence of a high salt concentration in the buffer solution which prevents either formic acid being washed out of the extract or water being additionally taken up in the extract. The ready solubility in formic acid of the formates used is necessary to ensure that the equilibrium between formic acid and nitrate is not shifted in favour of re-formation of formate and free nitric acid because the formic acid concentration is too high. Alkali metal formates are particularly suitable. Due to their capacity to form biformates and thus to fix formic acid, they have the effect that the buffer solutions in equilibrium with the extract are quite stable and are only modified in proportion as nitric acid is taken up during the washing of the extract.

Figure 3:
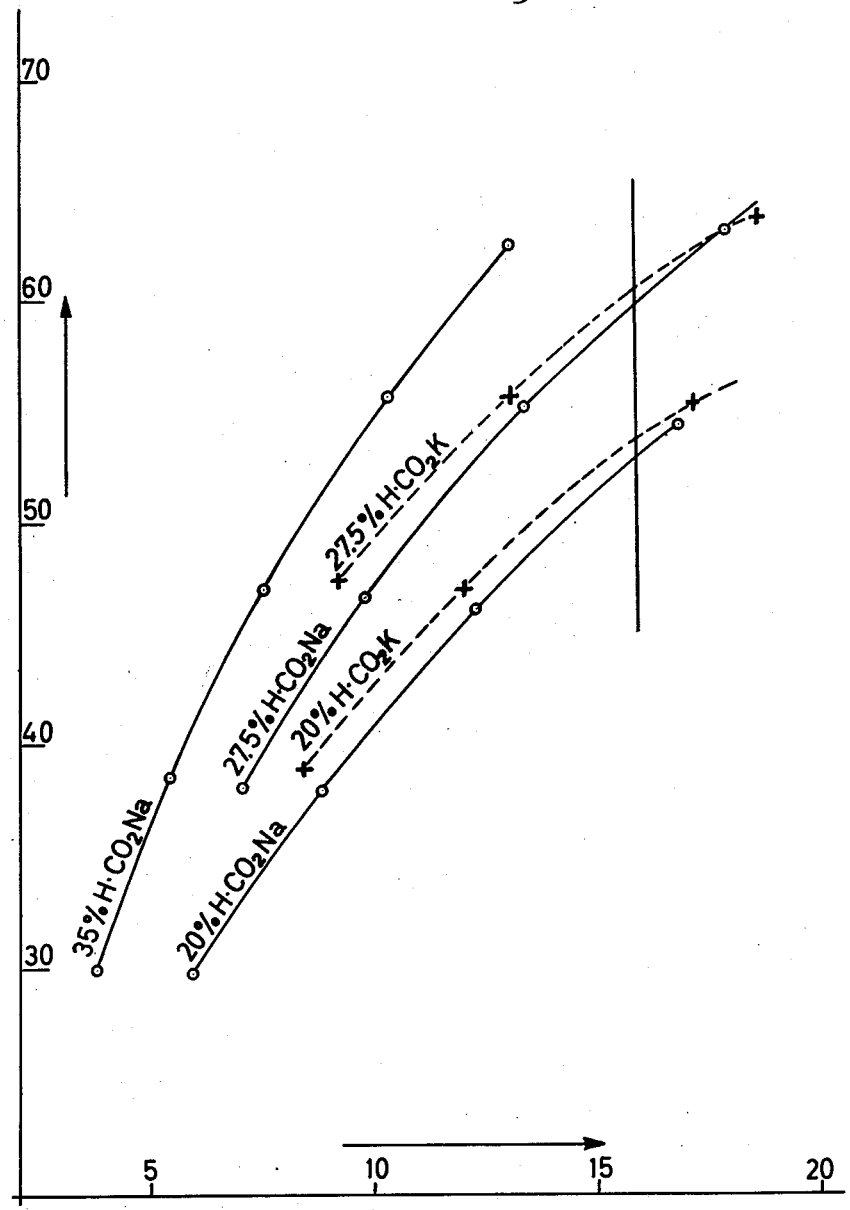

An optimum composition of the buffer solution exists for each extract which is to be washed free from nitric acid. In order to facilitate the selection, the distribution of the formic acid between the aqueous phase and extraction medium in dependence on the formic acid concentration was determined with three different salt concentrations, namely 20%, 27.5% and 35% of sodium or potassium formate, and plotted on a graph (Fig. 3). The points where these curves intersect the concentration line of the extracts which are to be washed free from nitric acid indicate the optimum composition of the buffer solution for the salt concentration actually being used. For example, if the extract contains 16% of formic acid, it is in equilibrium with an aqueous buffer solution which contains 27.5% of sodium formate and 59.7% of formic acid.

The distribution curve plotted for a salt content of 35% does not intersect this concentration line, which means that this salt content is too high.

It has been established that an extract containing nitric acid can be washed free from nitric acid with the aid of such a buffer solution until approximately 50% of the alkali formate is converted into nitrate. In order to make the reaction complete without any nitric acid remaining in the extract, a second washer can be connected after the first. When the alkali metal formate in the first washer has been completely converted into nitrate, this is renewed and the sequence of the washers is reversed.

If the present process is to be carried out in an economic manner, it is important that the starting mixture being used for the extraction contain as little water as possible. On the other hand, since an extraction of the type described can only be conducted in a liquid-liquid system, it is necessary always to have such an amount of water that this condition is maintained throughout the extraction process.

When the process is carried out on a practical scale, it has proved to be advantageous not to operate with as high a concentration as possible, but rather to use an approximately 62–63% nitric acid for the decomposition of the calcium formate, such as the acid which is formed on a large scale by distillation of dilute nitric acid. The dilute liquor leaving the extraction then contains approximately 4 mols of water to 1 mol of calcium nitrate, and is worked up in known manner to provide a calcium nitrate which can be used as a fertilizer.

The technical advance provided by the process of the invention as compared with the known state of the art as disclosed by German patent specification 831,240 is to be seen in the fact that when using a 98% nitric acid in accordance with the latter process, it is only possible to obtain a reaction mixture containing 6 mols of water to 1 mol of calcium nitrate, whereas a ratio of 4 mols of water to 1 mol of calcium nitrate can be obtained by the process of the invention, for example, with only a 62–63% nitric acid in the reaction mixture, this being despite the use of more dilute acid, and therefore substantially less water has to be evaporated during the working up.

The following example further illustrates the invention.

Example

Initially 45 g. of urea and then 1495 g. of calcium formate are dissolved in 2032 g. of a 62% nitric acid while stirring well and maintaining a temperature of 40–45° C. The reaction mixture thus obtained is then extracted countercurrently in 9 stages at 42° C. with 3.5 times its volume of diisopropyl ether, another 305 g. of the 62% nitric acid being added to the extraction medium in the 8th stage.

The extract contains 15.0% of formic acid and 0.265% of nitric acid, that is to say 1.75% based on the formic acid which is extracted. 0.6% of formic acid and 0.35% of calcium formate are left in the dilute liquor leaving the extraction.

In order to remove the remaining nitric acid from the extract containing formic acid, this extract is washed in two successive stages with an aqueous solution containing 27.5% of sodium formate and 58.2% of formic acid.

The extract is then absolutely free from nitric acid and is fractionally distilled for separating out the diisopropyl ether and very small amounts of water which are concurrently extracted. A 98% formic acid is left in the sump, and this is redistilled for complete purity. The yield of formic acid is higher than 97%.

What I claim is:
1. In a process for the production of anhydrous formic acid and nitrates wherein calcium formate is reacted with nitric acid, and the resulting formic acid is extracted from the reaction mixture in the presence of urea with a solvent and the resulting extract is fractionally dstilled, the steps which comprise reacting nitric acid with calcium formate to form a reaction mixture containing formic acid and an excess of calcium formate, countercurrently extracting formic acid from such reaction mixture in the presence of urea with a solvent for formic acid, adding to the extraction medium an amount of nitric acid equivalent to the excess of calcium formate contained in the reaction mixture in one of the last stages of the countercurrent extraction and thereafter washing the formic acid extract containing a small proportion of nitric acid with a solution of a formate in aqueous formic acid, the formic acid content of which is in equilibrium with that of the extract to render the extract absolutely free from nitric acid.

2. Process according to claim 1, wherein the reaction mixture used for the counter-current extraction contains an excess of approximately 13–15% of calcium formate.

3. Process according to claim 1, wherein the formate in the solution used to wash the formic acid extract is a formate which dissolves readily in both water and formic acid and the base of which, on reaction with nitric acid, forms a nitrate which is less soluble in the washing solution than the formate.

4. Process according to claim 3, wherein an alkali metal formate is used for the production of the formate solution.

5. Process according to claim 1, wherein the formic acid extract containing nitric acid is washed in stages.

6. Process according to claim 5, wherein the formic acid extract containing nitric acid is washed in such a way that not more than 50% of the alkali metal formate content of the washing liquid is converted into nitrate.

7. Process according to claim 1, wherein the starting mixture used for the extraction contains only such a proportion of water that a liquid-liquid system is just maintained during the extraction process.

References Cited in the file of this patent

UNITED STATES PATENTS 1,930,146    Othmer _____ Oct. 10, 1933

FOREIGN PATENTS 831,240    Germany _____ Feb. 11, 1952